United States Patent Office 3,686,182
Patented Aug. 22, 1972

3,686,182
3-AMINOALKYL-1-PHENYL-INDOLINES AND 2-INDOLINONES IN ALLEVIATING MENTAL DEPRESSION
Antonio Canas-Rodriquez and Peter R. Leeming, Canterbury, England, assignors to Pfizer Inc.
No Drawing. Application Apr. 4, 1968, Ser. No. 718,943, now Patent No. 3,574,232, dated Apr. 6, 1971, which is a continuation-in-part of application Ser. No. 706,672, Feb. 19, 1968. Divided and this application Mar. 9, 1970, Ser. No. 22,734
Claims priority, application Great Britain, Feb. 21, 1967, 8,172/67
Int. Cl. A61k 27/00
U.S. Cl. 424—274                    13 Claims

ABSTRACT OF THE DISCLOSURE

Novel 3-aminoalkyl-1-phenyl-indolines and 2-indolinones are disclosed.

The anti-depressant properties of these compounds as well as certain other 2-indolinone analogs thereof are also disclosed.

CROSS REFERENCE TO RELATED APPLICATIONS

This application is a division of application Ser. No. 718,943 filed Apr. 4, 1968 and now U.S. Patent 3,574,232, which is a continuation-in-part of application Ser. No. 706,672 filed Feb. 19, 1968, and now abandoned.

BACKGROUND OF THE INVENTION

This invention relates to certain novel therapeutic agents. More particularly, it relates to 3-aminoalkyl-1-phenyl-indolines and 2-indolinones and their ability to alleviate mental depression especially when administered orally.

SUMMARY OF THE INVENTION

Accordingly, the present invention discloses compounds having the formula:

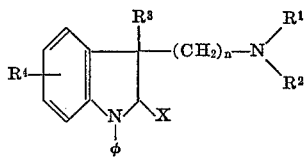

wherein $R^1$ and $R^2$ are each selected from the group consisting of hydrogen, alkyl of from 1 to 4 carbon atoms, benzyl and $R^1$ and $R^2$ when taken together, complete a ring selected from the group consisting of piperidino, pyrrolidino, morpholino, piperazino, N'-benzylpiperazino, N'-alkylpiperazino and N'-hydroxyalkylpiperazino, said alkyl containing from 1 to 4 carbon atoms;

$R^3$ is selected from the group consisting of alkyl of from 1 to 4 carbon atoms, phenyl and benzyl;

$R^4$ is selected from the group consisting of hydrogen, nitro and halogen (F, Cl, Br, I);

X is selected from the group consisting of 2 hydrogen atoms and an oxygen atom;

$n$ is an integer of from 2 to 4, when X is 2 hydrogen atoms, and is selected from the group consisting of 3 and 4 when X is an oxygen atom; and the pharmaceutically-acceptable acid addition salts thereof.

A particularly preferred embodiment of the above described feature of this invention concerns those compounds indicated by the above formula when $R^3$ is methyl, $R^4$ is hydrogen and $n$ is 3.

In addition, there is claimed a method of alleviating mental depression in a host which comprises administering to the host an effective amount of a compound selected from the group consisting of those of the formula:

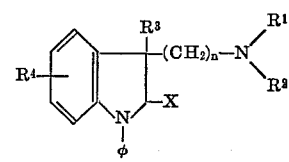

wherein $R^1$ and $R^2$ are each selected from the group consisting of hydrogen, alkyl of from 1 to 4 carbon atoms, benzyl and $R^1$ and $R^2$ when taken together, complete a ring selected from the group consisting of piperidino, pyrrolidino, morpholino, piperazino, N'-benzylpiperazino, N'-alkylpiperazino and N'-hydroxyalkylpiperazino, said alkyl containing from 1 to 4 carbon atoms;

$R^3$ is selected from the group consisting of alkyl of from 1 to 4 carbon atoms, phenyl and benzyl;

$R^4$ is selected from the group consisting of hydrogen, nitro and halogen (F, Cl, Br, I);

$n$ is an integer of from 2 to 4;

X is selected from the group consisting of 2 hydrogen atoms and an oxygen atom; and the pharmaceutically-acceptable acid addition salts thereof.

A preferred embodiment of the above described method concerns the utilization of those compounds wherein $R^3$ is methyl, $R^4$ is hydrogen, $n$ is 3 and X is either 2 hydrogens or an oxygen atom.

The compounds of this invention have marked activity on the central nervous system of the host which is treated. They have properties in common with anti-depressant drugs. In particular, they potentiate the response to low frequency electrical stimulation of the nictitating membrane of the cat, potentiate the effects of injected Epinephrine and Norepinephrine on the blood pressure of the cat and reverse the hypothermia caused by intraventricularly injected Norepinephrine in the mouse.

DETAILED DESCRIPTION OF THE INVENTION

The compounds of this invention fall into two distinct classes. The first class concerns 3-substituted-1-phenyl-2-indolinones and the second concerns the reduced analogs thereof. More specifically, the latter group is obtained by reducing the keto function in the 2-position to a methylene function. Although there exist several methods for synthesizing the indolinone derivatives, the easiest mode of preparation for the second group, that is, the indolines comprises the reduction of the aforesaid indolinones to the corresponding indolines. The aforesaid chemical reduction can be accomplished either by means of a lithium aluminum hydride reduction or via hydroboration. Hence, not only are the indolinone compounds useful per se for the utility described herein, but they are also invaluable chemical intermediates for the preparation of the useful indoline compounds.

The conversion of an indolinone to the corresponding indoline can be illustrated as follows:

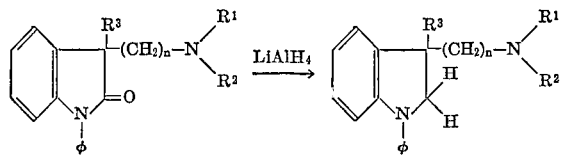

The above conversion can be effected by means of a lithium aluminum hydride reduction wherein the appropriate indolinone dissolved in ether is added to an ether solution of lithium aluminum hydride, said lithium aluminum hydride being present in a slight molar excess. Said addition is carried out under cooling conditions. Upon completion of addition, the resulting reaction mixture is refluxed for several hours, cooled and any remaining non-reacted lithium aluminum hydride is decomposed by the slow addition of water. The ether phase is separated, washed, dried and evaporated to provide the desired product. If such product is an oil, conversion to a crystalline acid addition salt is easily accomplished.

Another suitable reduction procedure makes use of diborane as the reducing agent. The indolinone to be reduced is dissolved in suitable solvent, e.g., tetrahydrofuran and in a flask fitted with an inlet from a diborane generator. The generated diborane is allowed to pass through the solution for about 3 hours whereupon the resulting reaction mixture is allowed to reflux for about one hour. The resulting solution is then cooled, acidified with one 5 N hydrochloric acid, and the solvents are removed leaving an oil which is subsequently extracted with ether and converted to a suitable acid addition salt such as the hydrogen maleate salt.

The second class of compounds disclosed herein are the 3-substituted-1-phenyl-2-indolinones which are the precursors of the just described indoline derivatives. That is to say, they are similar in every respect except for the persence of a keto group in the 2-position. Although there exist several synthetic routes for making such compounds, it has been found that three are prefererd for purposes of this invention. In all three cases, the started material is a 3-substituted-1-phenyl-2-indolinone of the formula:

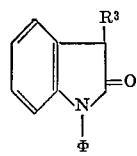

wherein $R^3$ is as defined above. These starting materials are known in the art and can be prepared by well known procedures. One such typical procedure is outlined in the Journal of Medicinal Chemistry, vol. 8, pp. 626–637 (1965).

The first of the three general procedures which can be used, and the most preferred, concerns the anionic condensation between the 3-mono-substituted-1-phenyl-2-indolinone and a halogenated alkyl amine in the presence of sodamide to yield the desired product. The reaction can be illustrated as follows:

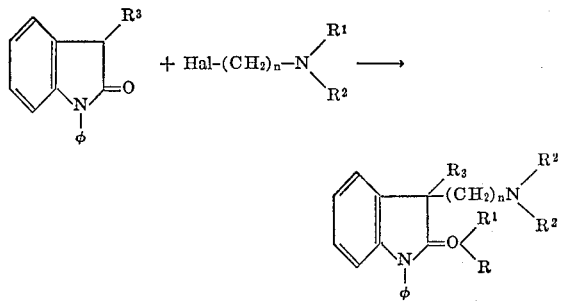

wherein Hal refers to a halogen atom, $n$, $R^1$, $R^2$ and $R^3$ are as defined above. The reaction is a basic condensation procedure wherein the indolinone dissolved in a suitable solvent, for instance, toluene, is added to a toluene solution of sodamide and the mixture is allowed to heat under reflux for about 2 hours. After this time, and with cooling, the appropriate halogenated alkyl amine is added and after addition, the resulting reaction mixture is refluxed for about 3 hours. Work-up consists of cooling, pouring into water, extracting with ether, separating, washing, drying and evaporating to give product.

The second general method for preparing the herein disclosed indolinone compounds is quite similar to the one just described. In this case, the 3-mono-substituted-1-phenyl-2-indolinone is reacted with a di-halogenated alkyl derivative illustrated herein below:

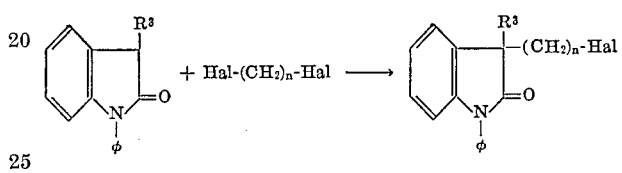

wherein Hal is a halogen atom, $R^3$ and $n$ are as defined above. The resulting product is then reacted with a secondary amine to provide the desired product. For example, when Hal is bromo and is reacted with N-methylpiperazine, the resulting N'-methylpiperazino compound is obtained. The reaction is carried out in suitable solvent, e.g., ethanol and generally an excess of the secondary amine is used. The work-up of the reaction comprises concentration, extraction and evaporation again.

The third method for preparing the subject indolinones concerns the reaction of the 3-mono-substituted-1-phenyl-2-indolinone with a halogenated nitrile to yield a cyano compound which can then be reduced to provide the corresponding primary amine. This reaction sequence can be shown as follows:

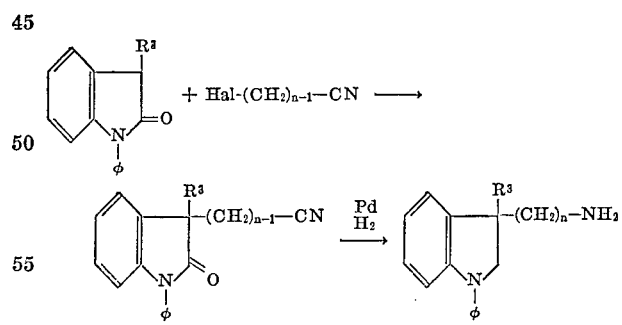

wherein Hal is a halogen atom, $R^3$ and $n$ are as defined above. The first step is carried out under basic condensation conditions. For example, the indolinone is dissolved in a suitable solvent such as toluene and combined with a toluene solution containing sodamide. The appropriate halogenated nitrile is then added and on completion of addition the resulting mixture refluxed for two to three hours. Work-up in the usual manner provides the cyano compound which is then converted to the corresponding primary amine compound in the following manner. The cyano derivative is dissolved in a mixture of glacial acetic acid and concentrated sulfuric acid and hydrogenated over platinum oxide until hydrogen uptake ceases. Filtration, concentration, addition of alkali, extraction and final evaporation yield the desired product.

In addition to the above, three principal synthetic procedures, there exist several process modifications which find application in the present disclosure. For instance, it may be possible to convert a di-substituted amino compound to the corresponding mono amino derivative. To illustrate, a dimethylamino compound can be converted to the monomethyl amino derivative by treatment with an alkyl chloroformate resulting in an intermediate alkyloxy carbonyl derivative which is subsequently removel by hydrolysis under acidic or basic conditions. Furthermore, a benzyl moiety attached to the nitrogen of the amino group may be converted to a hydrogen substituent by hydrogenation in the presence of palladium.

Another process modification applicable to the present invention concerns the conversion of a free amino group to the corresponding dimethylamino compound. This is a standard well-known reaction carried out in the presence of 90% formic acid followed by treatment with 37% aqueous formaldehyde.

A final process modification concerns the placement of various substituents onto the fused benzene ring. For example, treatment of an indolinone with sulfuryl chloride in glacial acetic acid results in the formation of the corresponding 5-chloro compound. Similarly, treatment with bromine in glacial acetic acid provides the corresponding 5-bromo compound.

The compounds of this invention have been found to alleviate mental depression particularly when administered orally. Additionally, the compounds of the invention give positive results in tests designed to show possession of the following properties:

(1) Potentiation of amphetamine excitation
(2) Antagonism of tetrabenazine sedation
(3) Antagonism of reserpine hypothermia
(4) Antagonism of norepinephrine hypothermia
(5) Potentiation of nictitating membrane
(6) Potentiation of norepinephrine on blood pressure These tests are well established methods for testing potential drugs in order to indicate whether they possess anti-depressant properties. Tests 1 and 2 are carried out in rats via oral administration. Tests 3 and 4 are run on mice, wherein test 3 utilizes intraperitoneal administration and test 4 is by oral administration. The last two, that is, 5 and 6 use the intravenous mode of administration wherein the host is a cat.

The compounds of the invention exist in D and L optically active isomeric forms, by virtue of the asymmetric carbon atom at position 3 in the indoline nucleus, and the invention comprehends the compounds in the separated D and L forms, as well as the racemic DL-mixtures produced by the above methods.

Acids from which pharmaceutically-acceptable addition salts of the compounds of the invention can be prepared are those which form non-toxic acid addition salts containing pharmaceutically-acceptable anions, such as the hydrochloride, hydrobromide, hydroiodide, sulphate or bisulphate, phosphate or acid phosphate, acetate, maleate, fumarate, lactate, tartrate, citrate, gluconate, saccharate and p-toluene sulfonate salts.

The compounds of the invention can be administered alone, but will generally be administered in admixture with a pharmaceutical carrier selected with regard to the intended route of administration and standard pharmaceutical practice. For example, they may be administered orally, preferentially in the form of tablets containing such excipients as starch or lactose, or in capsules either alone or in admixture with excipients, or in the form of elixirs or suspensions containing flavoring or coloring agents. They may be injected parenterally, for example, intramuscularly or subcutaneously. For parenteral administration, they are best used in the form of a sterile aqueous solution which may contain other solutes, for example, enough salts or glucose to make the solution isotonic.

With respect to dosage levels, a broad dosage range of 5 to 150 mg./day is appropriate. However, on a bodyweight basis, this would correspond to a dosage of about 0.05 to about 3.0 miligrams per kilogram per day. A particularly preferred range for adults is from 0.1 to about 1.0 mg./kg./day. The physician in any event will determine the dosage which will be most suitable for an individual patient and it wil vary with age, the weight and response of the particular patient. The above dosages are exemplary of the average host. There can, of course, be individual cases where higher or lower dosage ranges are merited, and such are within the scope of this invention.

EXAMPLE I 3-(3-dimethylaminopopyl)-3-methyl-1-phenyl-2-indolinone hydrochloride 3-methyl-1-phenyl-2-indolinone (22.3 g.; 0.1 mole) in dry toluene (50 ml.) is added slowly to sodamide (4.68 g.; 0.12 mole) in dry toluene (200 ml.). The mixture is heated under reflux for three hours by which time the evolution of $NH_3$ ceases. 3-dimethylamino-propylchloride (21 g., 0.173 mol., from 31 g. of the corresponding hydrochloride), is added to the cooled toluene solution. The mixture is then boiled under reflux for three hours, cooled and poured into water. The organic layer is separated from the aqueous one and the latter is extracted with ether. The combined organic fractions are washed with water, and then extracted with 4 N hydrochloric acid (4× 40 ml.). The aqueous layer is basified with 5 N sodium hydroxide, extracted with ether and the organic layer dried over $Na_2SO_4$ and evaporated to give a dark oil which was distilled. The main fraction distilled at 190–200° at 1 mm., giving 3-(3-dimethylaminopropyl)-3-methyl-1-phenyl-2-indolinone as an oil (22.5 g.; 73%). The hydrochloride is prepared in ethereal hydrochloric acid solution and is a colorless crystalline solid which after recrystallizations from chloroform-ethyl acetate and ethylacetate-methanol had a M.Pt. of 168–170° and 1 mol of water of crystallization.

*Analysis.*—Calcd. for $C_{20}H_{27}ClN_2O_2$ (percent): C, 66.15: H, 7.50; N, 7.71. Found (percent): C, 66.07; H, 7.14; N, 7.41.

EXAMPLE II

By a similar alkylation technique as described in Example I the following compounds are prepared wherein a stoichiometric equivalent amount of the appropriate alkylating agent is used in lieu of 3-dimethylamino-propyl chloride with comparable results. 3 - [2 - (N-benzyl-N-methylamino)ethyl] - 3-methyl-1-phenyl-2-indolinone hydrogen maleate. (From 2 - (N - benzyl-N-methylamino) ethyl chloride.) Recrystallized from ethylacetate (M.Pt.: 165–166°).

*Analysis.*—Calcd. for $C_{29}H_{30}N_2O_5$ (percent): C, 71.60; H, 6.18; N, 5.76. Found (percent): C, 71.87; H, 5.95; N, 5.68.

3 - [3-(N-benzyl-N-methylamino)propyl]-3-methyl-1-phenyl-2-indolinone hydrochloride. (From 3-(N-benzyl-N-methylamino)propyl chloride.) Recrystallized from hot water (M.Pt.: 198–205°).

*Analysis.*—Calcd. for $C_{26}H_{29}ClN_2O$ (percent): C, 74.18; H, 6.90; N, 6.66. Found (percent): C, 73.83; H, 6.93; N, 6.49.

3 - n - butyl-3-(2-dimethylaminoethyl)-1-phenyl-2-indolinone hydrochloride.—(From 3 - n-butyl-1-phenyl-2-indolinone and 2-dimethylamino-ethyl chloride.) The free base of the product after distillation at 200–205°/0.7 mm., was further purified by chromatography on a silica column. The desired material was eluted with acetone as an oil which was converted into the hydrochloride in the usual way. The crystalline hydrochloride was purified by repeated crystallizations from ethyl acetate - chloroform-ether to give pure 3-n-butyl-3-(2-dimethylaminoethyl)-1- phenyl-2-indolinone hydrochloride as colorless crystals (M.Pt.: 157–160°).

Analysis.—Calcd. for $C_{22}H_{29}ClN_2O$ (percent): C, 70.86; H, 7.84; N, 7.51; Cl, 9.51. Found (percent): C, 70.75; H, 7.69; N, 7.65; Cl, 9.59.

3 - n - butyl-3[2-(N-benzyl-N-methylamino)ethyl]-1-phenyl - 2-indolinone. (From 3-n-butyl-1-phenyl-2-indolinone and 2-(N-benzyl-N-methylamino)ethyl chloride.) B.Pt.: 220–230°/0.2 mm. Although no solid derivative could be obtained, nor any satisfactory analysis of the free base, the infrared and nuclear magnetic resonance spectra were consistent with the assigned structure. This material was used for further reactions.

3 - n - butyl-3-(3-dimethylaminopropyl)-1-phenyl-2-indolinone hydrogen maleate. (From 3-n-butyl-1-phenyl-2-indolinone and 3 - dimethylamino-propyl chloride.) Recrystallized from ethyl acetate-chloroform (M.Pt.: 144–145°).

Analysis.—Calcd. for $C_{27}H_{34}N_2O_5$ (percent): C, 69.50; H, 7.35; N, 6.00. Found (percent): C, 69.49; H, 7.05; N, 6.14.

5 - bromo - 3 - (3-dimethylaminopropyl)-3-methyl-1-phenyl - 2-indolinone hydrochloride. (From 5-bromo-3-methyl-1-phenyl-2-indolinone and 3-dimethylamino-propyl chloride.) Recrystallized from methanol/40–60° petrol. M.Pt.: 263–265°.

Analysis.—Calcd. for $C_{20}H_{24}BrClN_2O$ (percent): C, 56.68; H, 5.71; N, 6.61; Br, 18.85; Cl, 8.36. Found (percent): C, 56.92; H, 5.74; N, 6.38; Br, 19.24; Cl, 8.99.

EXAMPLE III 5-benzyl-3-[3-(N-benzyl-N-methylamino)-propyl]-1-phenyl-2-indolinone hydrogen oxalate 3-benzyl-1-phenyl-2-indolinone (15 g., 0.05 mol) is dissolved in dry dimethylformamide (60 ml.) and treated carefully with sodium hydride (1.2 g., 0.05 mol) at 60°. 3-(N-benzyl-N-methylamino) propyl chloride (9.9 g., 0.05 mol) is added and the mixture is heated to 60° for four hours. It is allowed to cool, poured into water and ether extracted. The organic extract is washed with water, dried and evaporated to give an oil which is treated with oxalic acid in ether.

3 - benzyl - 3 - [3-(N-benzyl-N-methylamino)propyl]-1-phenyl-2-indolinone hydrogen oxalate solidified as colorless crystals (M.Pt.: 158–160°).

Analysis.—Calcd for $C_{34}H_{34}N_2O_5$ (percent): C, 74.16; H, 6.22; N, 5.09. Found (percent): C, 74.03; H, 6.31; N, 5.27.

3 - (3 - dimethylaminopropyl) - 1,3-di-phenyl-2-indolinone hydrochloride was prepared. (From 1,3-diphenyl-2-indolinone and 3 - dimethylamino-propyl chloride.) Recrystallized from ethyl acetate-isopropanol. M.Pt.: 240.5–242°.

Analysis.—Calcd. for $C_{25}H_{27}ClN_2O$ (percent): C, 73.85; H, 6.53; N, 6.65. Found (percent): C, 73.77; H, 6.69; N, 6.88.

EXAMPLE IV 3-methyl-3-[2-(4-methyl-1-piperazinyl)ethyl]-1-phenyl-2-indolinone di-hydrogen maleate 3 - (2-bromoethyl)3-methyl-1-phenyl-2-indolinone (33 g., 0.1 mol), N-methylpiperazine (20 g., 0.2 mol) and ethanol (50 ml.) are heated under reflux for five hours. The mixture is concentrated in vacuo (1 mm., 100°) and the residue is neutralized with sodium carbonate solution, extracted with ether and methylene chloride and the combined organic extracts are washed with water and evaporated to give an oil. The oil is dissolved in dry ether and treated with an excess of ethereal solution of maleic acid. 3 - methyl - 3-[2-(4-methyl-1-piperazino)ethyl]-1-phenyl-2-indolinone di-hydrogen maleate separated as a white solid which was recrystallized from ethanol-water (15 g.; M.Pt.: 178–179°).

Analysis.—Calcd. for $C_{30}H_{35}N_3O_9$ (percent): C, 61.95; H, 6.07; N, 7.23. Found (percent): C, 61.82; H, 6.09; N, 6.94.

In a similar manner as above the following compounds are prepared using stoichiometric equivalent amounts of the appropriate reagents.

3 - methyl - 3-[2-(4-hydroxyethyl-1-piperazinyl)ethyl]-1-phenyl-2-indolinone dihydrogen maleate. (From N-hydroxyethyl piperazine.) Recrystallized from isopropanol. M.Pt.: 148–149°).

Analysis.—Calcd. for $C_{31}H_{37}N_3O_{10}$ (percent): C, 60.87; H, 6.10; N, 6.87. Found (percent): C, 61.15; H, 6.49; N, 7.10.

3 - methyl - 3 - (3 - piperidinopropyl) - 1 - phenyl-2 - indolinone hydrogen oxalate.—(From 3 - (3-bromopropyl) - 3 - methyl - 1 - phenyl - 2-indolinone and piperidine.) Recrystallized from ethanol. M.P.: 219–220°.

Analysis.—Calcd. for: $C_{25}H_{30}N_2O_5$ (percent): C, 68.47; H, 6.90; N, 6.39. Found (percent): C, 68.22; H, 6.98; N, 6.16.

3 - methyl - 3 - [3 - (4 - methyl - 1 - piperazinyl) propyl] - 1 - phenyl - 2 - indolinone dihydrogen maleate. (From 3 - (3 - bromopropyl) - 3 - methyl - 1 - phenyl-2 - indolinone and N-methyl piperazine.) Recrystallized from ethanol. M.P.: 178.5–179.5°.

Analysis.—Calcd. for $C_{31}H_{37}N_3O_9$ (percent): C, 62.51; H, 6,26; N, 7.06. Found (percent): C, 62.69; H, 6.23; N, 6.76.

3 - methyl - 3 - [3 - (4 - hydroxyethyl - 1 - piperazinyl) propyl] - 1 - phenyl - 2 - indolinone di-hydrogen maleate.—(From 3 - (3 - bromopropyl) - 3 - methyl-1-phenyl-2-indolinone and N-hydroxyethyl piperazine.) Recrystallized from isopropanol. M.P.: 141.5–142°.

Analysis.—Calcd. for $C_{32}H_{39}N_3O_{10}$ (percent): C, 61.43; H, 6.28; N, 6.72. Found (percent): C, 61.41; H, 6.27; N, 6.69.

3 - (3 - benzylaminopropyl) - 3 - methyl - 1 - phenyl-2 - indolinone hydrogen oxalate.—(From 3 - (3 - bromopropyl) - 3 - methyl - 1 - phenyl - 2 - indolinone and benzylamine.) Recrystallized from isopropanol-water. M.P.: 198–199°.

Analysis.—Calcd. for: $C_{27}H_{28}N_2O_5$ (percent): C, 70.42; H, 6.13; N, 6.08. Found (percent): C, 70.35; H, 6.35; N, 5.97.

An alternative method of preparing this material is as follows: A mixture of 3 - (3 - aminopropyl) - 3 - methyl-1 - phenyl - 2 - indolinone (21 g., 0.075 mol), benzaldehyde (8 g., 0.0755 mol) and dry xylene (100 ml.) is heated under reflux with azeotropic removal of the water formed. When no more water is given off, the mixture is heated for a further hour. The xylene is removed under reduced pressure, the residue (crude 3-(3-benzylidenaminopropyl) - 3 - methyl - 1 - phenyl - 2 - indolinone) is dissolved in methanol (100 ml.) and this solution is added to an aqueous methanolic solution (150 ml.) of sodium borohydride (8 g.) containing 1 ml. of 2 N sodium hydroxide solution. The mixture is allowed to stand overnight, after which the solvents are removed under reduced pressure and the resultant oil is ether extracted. The ethereal layer is extracted with 2-N-hydrochloric acid, giving an aqueous solution and a gum. The ether layer is discarded and the aqueous solution containing the gum is basified and ether extracted. The organic extract is dried over anhydrous sodium sulfate and the maleate salt prepared in the usual way. The 3 - (3 - benzylaminopropyl) - 3 - methyl - 1 - phenyl - 2 - indolinone hydrogen maleate is recrystallized from isopropanol-ethyl acetate to give colorless crystals (9.4 g., M.P. 157–159°).

Analysis.—Calcd. for: $C_{29}H_{30}N_2O_5$ (percent): C, 71.58; H, 6.22; N, 5.76. Found (percent): C, 71.49; H, 6.23; N, 5.62.

EXAMPLE V 3-(2-aminoethyl)-3-methyl-1-phenyl-2-indolinone hydrochloride

3 - cyanomethyl - 3 - methyl - 1 - phenyl - 2 - indolinone (45 g., 0.17 mol) is dissolved in a mixture of glacial acetic acid (250 ml.) and conc. sulphuric acid (5 ml.) and is hydrogenated at 50 p.s.i./50° over platinum oxide (0.5 g.) until the uptake of hydrogen ceases. The catalyst is filtered and the solution is concentrated in vacuo, basified with sodium carbonate solution and ether extracted. The extracts are dried over anhydrous solid $Na_2CO_3$, filtered and treated with an ethereal solution of HCl gas. 3 - (2 - aminoethyl) - 3 - methyl - 1 - phenyl-2-indolinone hydrochloride precipitated and is recrystallized from ethyl acetate and isopropanol-ethyl acetate to give colorless crystals (36.2 g., M.P.: 209–210° ).

*Analysis.*—Calcd. for: $C_{17}H_{19}ClN_2O$ (percent): C, 67.4; H, 6.32; N, 9.25. Found (percent): C, 67.35; H, 6.28; N, 8.92.

In a similar manner as above the following compounds are prepared using stoichiometric equivalent amounts of indolinone reagent. 3 - (3 - aminopropyl) - 3 - 1 - phenyl-2-indolinone hydrochloride. (From 3 - (2 - cyanoethyl)-3 - methyl - 1 - phenyl - 2 - indolinone.) Recrystallised from ethyl acetate-isopropanol. M.P.: 187–188.5°.

*Analysis.*—Calcd. for $C_{18}H_{21}ClN_2O$: C, 68.22; H, 6.68; N, 8.84. Found (percent) C, 68.40; H, 6.71; N, 8.74.

3 - (4 - aminobutyl) - 3 - methyl - 1 - phenyl - 2 - indolinone hydrochloride. (From 3 - (3 - cyanopropyl)-3 - methyl - 1 - phenyl - 2 - indolinone.) Recrystallized from ethyl acetate-chloroform. M.P.: 197.5–199°.

*Analysis.*—Calcd. for: $C_{19}H_{23}ClN_2O$ (percent): C, 68.92; H, 7.0; N, 8.46. Found (percent): C, 68.68; H, 7.09; N, 8.33.

3 - (3 - aminopropyl) - 3-n-butyl-1-phenyl-2-indolinone hydrogen maleate. (From 3 - n-butyl - 3 - (2 - cyanoethyl - 1 - phenyl - 2 - indolinone.) Recrystallized from ethyl acetate-80–100° petrol. M.P.: 118–121°.

*Analysis.*—Calcd. for: $C_{25}H_{30}N_2O_5$ (percent): C, 68.92; H, 7.0; N, 8.46. Found (percent): C, 68.68; H, 6.88; N, 6.26.

EXAMPLE VI

3-n-butyl-3-(3-methylaminopropyl)-1-phenyl-2-indolinone fumarate

A mixture of 3-n-butyl-3-(3-benzylidenaminopropyl)-1-phenyl-2-indolinone[1] (20 g., 0.05 mol) and methyl iodide (70 ml.) is heated at 100° in a pressure vessel for 4–5 hours. The reaction mixture is evaporated in vacuo and the residual oil is extracted into ether. The extract is treated with 5 N HCl, and the acidic aqueous layer is basified and ether extracted. The oil obtained on evaporation of the solvent is distilled (10.6 g., 206–210°/1 mm.). The neutral fumarate is prepared in ether-isopropanol and recrystallized from isopropanol-ethyl acetate to give 3 - n-butyl - 3 - (3 - methylaminopropyl)-1-phenyl-2-indolinone fumarate as colorless crystals (10.4 g., M.P.: 173–175°).

*Analysis.*—Calcd. for $C_{48}H_{60}N_4O_6$: C, 73.06; H, 7.67; N, 7.10. Found (percent): C, 73.28; H, 7.56; N, 7.00.

In a similar manner 3 - methyl - 3 - (4 - methylaminobutyl) - 1 - phenyl - 2 - indolinone hydrochloride is prepared from 3 - (4 - aminobutyl) - 3 - methyl - 1 - phenyl-2 - indolinene hydrochloride via 3 - (4 - benzylidenaminobutyl) - 3 - methyl - 1 - phenyl - 2 - indolinone. Recrystallized from chloroform-ethyl acetate. M.P.: 164–167°.

---

[1] 3 - n - butyl - 3 - (3 - benzylidenaminopropyl)-1-phenyl-2-indolinone. A mixture of 3-n-butyl-3-(3-aminopropyl)-1-phenyl-2-indolinone (18.2 g., 0.0566 mol) and benzaldehyde (5.9 g., 0.0566 mol) in dry benzene (200 ml.) are heated under reflux with azeotropic removal of the water until the calculated quantity is collected. The reaction is evaporated to a thick oil which crystallized slowly on standing. Trituration of the semicrystalline mass with 60–80° petrol gives a colorless solid which is recrystallized from 60–80° petrol-chloroform to yield pure 3-n-butyl-3-(3-benzylidenaminopropyl)-1-phenyl-2-indolinone (18 g., M.P.: 106–108°).
*Analysis.*—Calcd. for $C_{28}H_{30}N_2O$ (percent) : C, 81.91; H, 7.37; N, 6.82. Found (percent) : C, 82.02; H, 7.16; N, 6.62.

*Analysis.*—Calcd. for $C_{20}H_{25}ClN_2O$ (percent): C, 69.65; H, 7.31; N, 8.12. Found (percent): C, 69.12; H, 7.22; N, 9.65.

EXAMPLE VII

3 - n-butyl - 3 - (3 - dimethylaminopropyl) - 1-phenyl-2 - indolinone hydrogen maleate.

To 3 - n - butyl - 3 - (3 - aminopropyl) - 1 - phenyl - 2 - indolinone (12 g., 0.0374 mol) 90% formic acid solution (5.1 g., 0.1 mol) is added with cooling, followed by 37% aqueous formaldehyde solution (7.5 ml., 0.1 mol). The mixture is heated on the water bath (90°) for two hours, then heated under reflux for three hours and finally evaporated, basified and extracted with ether. The residual oil obtained after evaporation of the solvent is distilled at 180–190°/0.2 mm. (6.5 g.). The maleate salt from this oil is prepared in ether in the usual way. It is recrystallized from ethyl acetate-chloroform to give pure 3-n-butyl - 3 - (3 - dimethylaminopropyl) - 1 - phenyl - 2 - indolinone hydrogen maleate as colorless crystals (6. g., M.P.: 144–145°).

*Analysis.*—Calcd. for: $C_{27}H_{34}N_2O_5$ (percent): C, 69.50; H, 7.35; N, 6.00. Found (percent): C, 69.49; H, 7.05; N, 6.14.

EXAMPLE VIII

3-(3-dimethylaminopropyl)-3-methyl-1-phenyl-indoline hydrogen maleate

3 - (3 - dimethylaminopropyl - 3 - methyl-1-phenyl-2-indolinone ( 25 g., 0.081 mol) in ether (250 ml.) is added over thirty minutes to an ice-cooled suspension of lithium aluminium hydride (5 g., 0.132 mol) in ether (250 ml.). The reaction mixture is heated under reflux for nine hours, cooled in ice, and carefully treated with water (5 ml.) followed by 5 N NaOH (5 ml.). The mixture is filtered and the residue washed with ether. The filtrate is dried over $Na_2CO_3$ and evaporated. The residual oil is dissolved in ethyl acetate and treated with an ethyl acetate solution of maleic acid which precipitated pure 3-(3-dimethylaminopropyl) - 3-methyl-1-phenyl-indoline hydrogen maleate as colorless crystals. (M.P.: 124–126°.)

*Analysis.*—Calcd. for: $C_{24}H_{30}N_2O_4$ (percent): C, 70.22; H, 7.37; N, 6.82. Found (percent): C, 70.31; H, 7.28; N, 6.66.

In a similar manner as above the following compounds are prepared using a stoichiometric equivalent amount of the corresponding indolinone: 3-(2-dimethylaminoethyl)-3 - methyl - 1 - phenyl - indoline hydrogen maleate. (From 3 - ( 2 - dimethylaminoethyl) - 3 - methyl - 1-phenyl-2-indolinone.) Recrystallized from isopropanol-water. M.P.: 144–142°.

*Analysis.*—Calcd. for: $C_{23}H_{28}N_2O_4$ (percent): C, 69.67; H, 7.12; N, 7.07. Found (percent): C, 69.37; H, 7.09; N, 6.93.

3 - [2 - (N - benzyl - N - methylaminoethyl] - 3 - methyl - 1 - phenyl - indoline. (From 3-[2 - (N - benzyl-N-methylamino)ethyl] - 3 - methyl - 1-phenyl-2-indolinone.) The crude base solidified on standing (M.P.: 72–75°) and it was recrystallized from 40–60° petrol. (M.P.: 75–78°).

*Analysis.*—Calcd. for: $C_{25}H_{28}N_2$ (percent): C, 84.22; H, 7.93; N, 7.86. Found (percent): C, 84.01; H, 7.83; N, 7.73.

3 - [3 - (N - benzyl - N - methylamino)propyl]-3-methyl - 1 - phenyl-indoline. (From 3 - [3-N-benzyl-N-methylamino)propyl] - 3 - methyl - 1 - phenyl-2-indolinon.) The pure base distilled at 206°/0.2 mm.

*Analysis.*—Calcd. for: $C_{26}H_{30}N_2$ (percent): C, 84.28; H, 8.16; N, 7.56. Found (percent): C, 84.10; H, 7.92; N, 7.37.

3 - n - butyl - 3 - (2 - dimethylaminoethyl)-1-phenyl-indoline hydrogen fumarate. (From 3-n-butyl-3-(2-dimethylaminoethyl) - 1 - phenyl-2-indolinone.) Recrystallized from isopropanol-chloroform-ethyl acetate. M.P.: 176–179°.

*Analysis.*—Calcd. for: $C_{26}H_{34}N_2O_4$ (percent): C, 71.20; H, 7.82; N, 6.39. Found (percent): C, 71.12; H, 7.59; N, 6.20.

3 - n - butyl - 3 - (3 - dimethylaminopropyl)-1-phenyl-indoline. (From 3-n-butyl-3-(3-dimethylaminopropyl)-1-phenyl-2-indolinone.) The free base distilled at 188–194°/1 mm.

*Analysis.*—Calcd. for: $C_{23}H_{32}N_2$ (percent): C, 82.09; H, 9.59; N, 8.33. Found (percent): C, 82.07; H, 9.61; N, 8.43.

EXAMPLE IX 3-methyl-3-(2-methylaminoethyl)-1-phenyl-2-indolinone hydrochloride Procedure (i): 3-(2-dimethylaminoethyl)-3-methyl-1-phenyl-2-indolinone (10 g., 0.003 mol) in dry xylene (75 ml.) is treated with ethylchloroformate (10 mls.) and the mixture is warmed to 60–70° for one hour. An evolution of gas took place for a short time and a small amount of gum precipitated. More ethyl chloroformate (10 ml.) is added and the heating is continued for one and a half hours. The excess of ethyl chloroformate is removed by distillation and the volume of the reaction mixture is maintained by addition of dry xylene. The mixture is heated under reflux for four hours, cooled, extracted with 1 N HCl, washed with water, dried over anhydrous $Na_2SO_4$ and evaporated. The resultant syrup (8 g.) is heated under reflux for 16–17 hours with 40% solution of hydrobromic acid in glacial acetic acid (50 ml.). The mixture is evaporated in vacuo and the resultant syrup is treated with water and ether extracted to remove unreacted urethane. The aqueous layer is basified with cold aqueous solution of $Na_2CO_3$ and ether extracted. The ethereal extract is dried over magnesium sulphate, filtered and treated with an ethereal solution of HCl. An oil precipitated which slowly solidified. This material is recrystallized from isopropanolethyl acetate to give 3-methyl-3 - (2 - methylaminoethyl) - 1 - phenyl - 2 - indolinone hydrochloride as a colorless solid (6.5 g.; M.P.: 194–196°).

*Analysis.*—Calcd. for: $C_{18}H_{21}ClN_2O$ (percent): C, 68.24; H, 6.68; N, 8.84. Found (percent): C, 68.43; H, 6.73; N, 8.78.

Procedure (ii): 3 - [2 - (N - benzyl-N-methylamino) ethyl] - 3 - methyl - 1 - phenyl - 2 - indolinone (164 g., 0.4 mol) is dissolved in absolute ethanol (650 ml.) and a solution of palladium chloride (6 g.) in water (40 ml.) containing sodium chloride (4 g.) is added. The mixture is cautiously treated with a solution of sodium borohydride (6 g.) in water (40 ml.) over a period of ten minutes with stirring. Stirring is continued for a further 15 minutes and the pH then adjusted to 1 with concentrated hydrochloric acid. The mixture was hydrogenated at 50 p.s.i. and 60° for 16 hours by which time the theoretical amount of hydrogen had been adsorbed. The mixture is filtered and the solvent removed under reduced pressure. The residual oil is dissolved in water (250 mls.), basified with 5 N sodium hydroxide solution and extracted with ether (4× 200 ml.). The extracts are dried over magnesium sulphate and treated with dry hydrogen chloride giving a gummy precipitate which, after trituration with acetone, solidified. The product is collected by filtration, washed with acetone and ether, then dried at room temperature in vacuo to give 3-methyl-3-(2-methylaminoethyl)-1-phenyl-2-indolinone hydrochloride as a white solid (95 g., M.P.: 194–197°). It is recrystallized from isopropanol-ethyl acetate. (M.P.: 195–197°).

*Analysis.*—Calcd. for: $C_{18}H_{21}ClN_2O$ (percent): C, 68.24; H, 6.68; N, 8.84. Found (percent): C, 68.13; H, 6.78; N, 8.71.

The following compounds are prepared according to one or both of the above-mentioned procedures:

(a) 3-methyl-3-(3-methylaminopropyl-1-phenyl-2-indolinone hydrochloride

Procedure (i). Recrystallized from isopropanol-ethyl acetate (M.P.: 168–170°).

*Analysis.*—Calcd. for: $C_{19}H_{23}ClN_2O$ (percent): C, 68.97; H, 7.00; N, 8.47. Found (percent): C, 68.72; H, 6.95; N, 8.16.

Procedure (ii). The catalytic reduction of 3-[3-(N-benzyl-N-methylamino) propyl] - 3 - methyl - 1 - phenyl-2-indolinone hydrochloride was carried out using the following conditions: 10% palladium on charcoal, 360 p.s.i. and 60° (instead of $PdCl_2+NaBH_4$ at 50 p.s.i./60 C. The resultant solid was recrystallized from ethyl acetate-ethanol (M.P.: 172.5–173.5°).

*Analysis.*—Calcd. for: $C_{19}H_{23}ClN_2O$ (percent): C, 68.97; H, 7.00; N, 8.47. Found (percent): C, 69.36; H, 7.08; N, 8.20.

(b) 3-n-butyl-3-(2-methylaminoethyl)-1-phenyl-2-indolinone hydrogen maleate

Procedure (ii). (From 3-n-butyl-3-[2-(N-benzyl-N-methylamino)ethyl] - 1 - phenyl - 2 - indolinone.) Recrystallized from ethyl acetate-chloroform ($PdCl_2+NaBH_4$ method)

(M.P.: 154–157°).

*Analysis.*—Calcd. for: $C_{25}H_{30}N_2O_5$ (percent): C, 68.47; H, 6.90; N, 6.39. Found (percent): C, 68.47; H, 6.81; N, 6.11.

(c) 3-benzyl-3-(3-methylaminopropyl)-1-phenyl-2-indolinone hydrogen oxalate

Procedure (ii). (From 3-benzyl-3-[3-(N-benzyl-N-methylamino)propyl] - 1 - phenyl-2-indolinone.) (Pd/C method.) Recrystallized from ethanol (M.P.: 162–165°).

*Analysis.*—Calcd. for: $C_{27}H_{28}N_2O_5$ (percent): C, 70.42; H, 6.13; N, 6.08. Found (percent): C, 70.57; H, 6.13; N, 5.98.

(d) 3-methyl-3-(3-methylaminopropyl)-1-phenyl-indoline hydrogen maleate

3 - methyl - 3 - (3 - dimethylaminopropyl) - 1 - phenyl-indoline was treated with ethyl chloroformate recording to Procedure (i) but with the variation that the hydrolysis of the resulting urethane was carried out under alkaline conditions (10% KOH in n-butanol, at 120–130° for 24 hours). The hydrogen maleate salt was prepared from the oily base and recrystallized from ethyl acetate (M.P.: 130–131°).

*Analysis.*—Calcd. for: $C_{23}H_{28}N_2O_4$ (percent): C, 69.67; H, 7.12; N, 7.07. Found (percent): C, 69.89; H, 7.05; N, 6.80.

(e) 3-n-butyl-3-(2-methylaminoethyl)-1-phenyl-indoline hydrogen maleate

Procedure (i). (From 3-n-butyl-3-(2-dimethylaminoethyl)-1-phenyl-indoline.) The free base distilled at 185–200°/1.5 mm. The hydrogen maleate salt was recrystallized from ethyl acetate-chloroform (M.P.: 153–156°).

*Analysis.*—Calcd. for $C_{25}H_{32}N_2O_4$ (percent): C, 70.72; H, 7.60; N, 6.60. Found (percent): C, 70.70; H, 7.63; N, 6.79.

(f) 3-n-butyl-3-(3-methylaminopropyl)-1-phenyl-indoline procedure (i)

(From 3-n-butyl-3-(3-dimethylaminopropyl)-1-phenyl-indoline.) The free base distilled at 210–220°/1.5 mm.

*Analysis.*—Calcd. for $C_{22}H_{30}N_2$ (percent): C, 81.93; H, 9.38; H, 8.69. Found (percent): C, 81.77; H, 9.37; N, 8.79.

EXAMPLE X 3-methyl-3-(3-methylaminopropyl)-1-phenyl-indoline hydrogen maleate 3 - methyl - 3 - (3 methylaminopropyl) - 1 - phenyl - 2-indolinone (40 g., 0.136 mol) in tetrahydrofuran (400 ml.) is placed in a flask fitted with an inlet from a fiborane generator. The diborane generator is charged with sodium borohydride (95 g., 2.5 mol.) and dimethyl digol (600 ml.). After a preliminary purge of the apparatus for fifteen minutes with nitrogen, the cautious addition of boron trifluoride diethyl etherate (440 ml., 3.5 mol) to the generator was commenced with strong ice-cooling. The generation of diborane took three hours and at the end of this period the apparatus was purged with nitrogen for thirty minutes and the tetrahydrofuran solution in the reaction vessel was heated under reflux for one hour. The solution is then cooled in ice and cautiously treated with 5 N NCl (100 ml.). The solvents are removed in vacuo leaving a thick, colorless oil which is dissolved in hot water (300 ml.), cooled to room temperature, basified with 5 N NaOH (200 ml.) and extracted with ether (3×200 ml.). The extracts gave on evaporation an oil from which the hydrogen maleate salt was prepared in the usual way. M.P.: 129–131°, 47 g. Recrystallization of this material from ethyl-acetate gave pure 3-methyl-3-(3-methylaminopropyl)-1-phenyl-indoline hydrogen maelate as colorless crystals. MP.: 130–131°.

*Analysis.*—Calcd. for $C_{23}H_{28}N_2O_4$ (percent): C, 69.68; H, 7.13; N, 7.07. Found (percent): C, 69.62; H, 6.84; N, 7.22.

EXAMPLE XI 5-chloro-3-methyl-3-(3-methylaminopropyl)-1-phenyl-2-indolinone hydrochloride Sulphuryl chloride (4.1 g., 0.03 mol.) in glacial acetic acid (10 ml.) is added to a cooled solution of 3-methyl-3-(3-methylaminopropyl)-1-phenyl-2-indolinone hydrochloride (10 g., 0.03 mol.) in glacial acetic acid (100 ml.), the temperature being kept below 20°. The mixture is stirred at room temperature for two hours, evaporated, basified and extracted into ether. The dried ethereal solution is treated with HCl gas and the precipitated oil solidified on trituration with dry ether. The solid is recrystallized from isopropanol—60–80° petrol to give 5-chloro-3-methyl-3-(3-methylaminopropyl)-1-phenyl - 2 - indoline hydrochloride as colorless crystals, (6.3 g., MP.: 196–199°). The position of the chlorine atom was ascertained by nuclear magnetic resonance techniques.

*Analysis.*—Calcd. for: $C_{19}H_{22}Cl_2N_2O$ (percent): C, 62.46; H, 6.07; N, 7.67; Cl, 19.42. Found (percent): C, 62.32; H, 5.91; N, 7.49; Cl, 19.27.

EXAMPLE XI-A 3-(3-dibenzylaminopropyl)-3-methyl-1-phenyl-2-indolinone

To 3 - (3 - benzylaminopropyl)-3-methyl-1-phenyl-2-indolinone (10 g.; 0.027 mol.) in dimethyl formamide (200 ml.), sodium hydride (50% oil-dispersed, 1.5 g.; 0.036 mole.) is added slowly at 60°. The mixture is stirred for one hour before the addition of benzyl bromide (5.2 g.; 0.03 mol.), after which the temperature (60°) and the stirring are held for a period of three hours. The reaction mixture is evaporated in vacuo, the residue is made alkaline and extracted into ether. The organic layer is separated, dried over MgSO₄ and evaporated to give an oil which is chromatographed in a silica column. Elution of the column with benzene and benzene-chloroform gives an oil which is distilled in vacuo at 220° and 0.1 mm. pressure Hg to yield 2 g. of 3-(3-dibenzylaminopropyl)-3-methyl-1-phenyl-2-indolinone as a colorless oil.

*Analysis.*—Calcd. for: $C_{32}H_{32}N_2O$ (percent): C, 83.44; H, 7.00; N, 6.08. Found (percent): C, 84.01; H, 7.25; N, 5.49.

EXAMPLE XII 5-bromo-3-methyl-3(3-methylaminopropyl)-1-phenyl-2-indolinone hydrochloride To a cooled solution of 3-methyl-3-(3-methylaminopropyl) 1 phenyl-2-indolinone hydrochloride (3.3 g., 0.01 mol.) in glacial acetic acid (30 ml.), a solution of bromine (1.60 g.) in glacial acetic acid (5 ml.) is added, with stirring. The mixture is allowed to stand at room temperature for thirty minutes, after which it was evaporated, basified and extracted with ether. When the dry etheral extract is treated with dry HCl gas, an oil precipitated which solidified on trituration with ether. The solid is recrystallized from isopropanol-ethyl acetate to give 5-bromo - 3 - methyl - 3 - (3 - methylaminopropyl) 1 - phenyl-2-indolinone hydrochloride as colorless crystals. (2.9 g.; M.P.: 189–191°).

*Analysis.*—Calcd. for: $C_{19}H_{22}BrClN_2O$ (percent): C, 55.69; H, 5.41; N, 6.83. Found (percent): C, 55.56; H, 5.49; N, 6.65.

EXAMPLE XII-A 3-methyl-3-(3-methylaminopropyl)-1-phenyl-indoline

The above compound, as the p-toluenesulfonate salt, is prepared in the following manner:

3-methyl-3-(3-methylaminopropyl)-1 - phenyl - indoline (100 g.) as prepared in Example X is dissolved in acetone (600 ml.) and p-toluene sulphonic acid monohydrate (68.7 g.), is dissolved in acetone (600 ml.), is added with agitation at 20°–30° C. The solid product, which started to crystallize within a few minutes, is allowed to granulate by standing at room temperature for 1 hour, followed by a further 16 hours at 0°–° C., and then separated from the liquors by filtration, washed with acetone (120 ml.) and sucked dry for 30 minutes. It is then dried at 35° C. for 16 hours in vacuo. Yield: 145 g. (90% stoichiometric). Melting point: 122°–122.5° C.

*Analysis.*—Calcd. for $C_{26}H_{32}O_3N_2S$ (percent): C, 68.97; H, 7.13; N, 6.19; S, 7.09. Found (percent): C, 69.25; H, 6.82; N, 6.12; S, 7.02.

EXAMPLE XII-B

Formulation of stable tablets and capsules of 3-methyl-3-(3-methylaminopropyl)-1-phenyl - 2 - indolinone hydrochloride (described in Example IX(a) is effected using the following ingredients:

Tablets:

| | Mg./tablet |
|---|---|
| 3-methyl-3-(3-methylaminopropyl)-1 - phenyl-2-indolinone hydorchloride | 10.0 |
| Dicalcium phosphate | 120.0 |
| Mazie starch | 20.0 |
| Magnesium stearate | 1.6 |
| Sodium lauryl sulfate | 0.2 |

The ingredients are blended and compressed. The compressed pieces are then broken into granules and compressed into tablets.

Capsules:

| | Mg./capsule |
|---|---|
| 3-methyl-3-(3-methylaminopropyl)-1-phenyl-2-indolinone hydrochloride | 10.0 |
| Maize starch | 127.0 |
| Microcrystalline cellulose | 127.0 |
| Mg stearate | 5.4 |
| Na lauryl sulfate | 0.6 |

The ingredients are blended and filled into a hard gelatine capsule of suitable size.

EXAMPLE XIII

The following tables summarize the results obtained from 6 different experiments carried out to show that the compounds of this invention have properties in common with anti-depressant drugs:

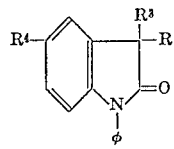

TABLE I

| | R | R³ | R⁴ |
|---|---|---|---|
| (a) | $-CH_2-CH_2-NH_2$ | $CH_3$ | H |
| (b) | $-CH_2-CH_2-NHMe$ | $CH_3$ | H |
| (c) | $-CH_2-CH_2-N(CH_2\phi)(Me)$ | $CH_3$ | H |
| (d) | $-CH_2-CH_2-N\text{(piperazinyl)}N-Me$ | $CH_3$ | H |
| (e) | $-CH_2-CH_2-N\text{(piperazinyl)}N-CH_2-CH_2OH$ | $CH_3$ | H |
| (f) | $-CH_2-CH_2-CH_2-NH_2$ | $CH_3$ | H |
| (g) | $-CH_2-CH_2-CH-NHMe$ | $CH_3$ | H |
| (h) | $-CH_2-CH_2-CH_2-NMe_2$ | $CH_3$ | H |
| (i) | $-CH_2-CH_2-CH_2-N(CH_2\phi)(Me)$ | $CH_3$ | H |
| (j) | $-CH_2-CH_2-CH_2NH-CH_2\phi$ | $CH_3$ | H |
| (k) | $-CH_2-CH_2-CH_2-N(CH_2-CH_2\phi)(Me)$ | $CH_3$ | H |
| (l) | $-CH_2-CH_2-CH_2-N\text{(piperidinyl)}$ | $CH_3$ | H |
| (m) | $-CH_2-CH_2-CH_2-N\text{(piperazinyl)}N-Me$ | $CH_3$ | H |
| (n) | $-CH_2-CH_2-CH_2-N\text{(piperazinyl)}N-CH_2-CH_2OH$ | $CH_3$ | H |
| (o) | $-CH_2-CH_2-CH_2-CH_2-NH_2$ | $CH_3$ | H |
| (p) | $-(CH_2)_3-NHMe$ | $CH_3$ | Cl |
| (q) | $-(CH_2)_3-NHMe$ | $CH_3$ | Br |
| (r) | $-(CH_2)_3-NMe_2$ | $CH_3$ | Br |
| (s) | $-CH_2-CH_2-NHMe$ | $n-C_4H_9$ | H |
| (t) | $-CH_2-CH_2-NMe_2$ | $n-C_4H_9$ | H |
| (u) | $-CH_2-CH_2-CH_2-NH_2$ | $n-C_4H_9$ | H |
| (v) | $-CH_2-CH_2-CH_2-NHMe$ | $n-C_4H_9$ | H |
| (w) | $-CH_2-CH_2-CH_2-NHMe_2$ | $n-C_4H_9$ | H |
| (x) | $-(CH_2)_3-NMe_2$ | $\phi$ | H |
| (y) | $-(CH_2)_3-NHMe$ | $\phi-CH_2-$ | H |
| (z) | $-(CH_2)_4-NHMe$ | $CH_3$ | H |
| (aa) | $-(CH_2)_3-N(CH_2-\phi)_2$ | $CH_3$ | H |

| | (1) | (2) | (3) | (4) | (5) | (6) |
|---|---|---|---|---|---|---|
| | Potentiatio excitation of amphetamine | Antagonism of tetrabenazine sedation | Antagonism of reserpine hypothermia | Antagonism of norepinephrine hypothermia | Potentiation of nictitating membrane | Potentiation of norepinephrine on blood pressure |
| (a) | +++ | 0 | ± | 0 | 0 | 0 |
| (b) | + | 0 | +/++ | ++ | ++ | ± |
| (c) | + | 0 | 0 | +++ | 0 | ++ |
| (d) | ++ | 0 | 0 | ++ | − | − |
| (e) | + | 0 | 0 | 0 | − | − |
| (f) | ++ | 0 | 0 | + | + | 0 |
| (g) | ++ | +/++ | +/+++ | +++ | +++ | ++ |
| (h) | ++ | 0 | + | +++ | +/++ | +++ |
| (i) | +/+++ | ++/+++ | + | ++ | +/+ | 0 |
| (j) | + | 0 | 0 | ++ | 0 | ++ |
| (k) | +++ | 0 | 0 | ++ | − | − |
| (l) | ++ | 0 | 0 | 0 | 0 | 0 |
| (m) | ++ | 0 | 0 | + | 0 | 0 |
| (n) | 0 | 0 | 0 | 0 | 0 | + |
| (o) | +++ | 0 | 0 | +++ | + | +++ |
| (p) | + | 0 | 0 | ++ | 0 | 0 |
| (q) | + | 0 | 0 | ++ | +++ | ++ |
| (r) | + | 0 | 0 | 0 | 0 | 0 |
| (s) | 0 | 0 | 0 | ++ | + | 0 |
| (t) | ++ | 0 | 0 | + | 0 | 0 |
| (u) | + | 0 | 0 | 0 | 0 | 0 |
| (v) | + | 0 | ± | ++ | + | ++ |
| (w) | + | 0 | 0 | +/++ | 0 | ++ |
| (x) | +/++ | 0 | 0/+ | + | − | − |
| (y) | + | 0 | 0 | 0 | − | − |
| (z) | +++ | 0 | 0/+ | +++ | − | − |
| (aa) | 0/+ | 0 | ---- | 0 | − | − |

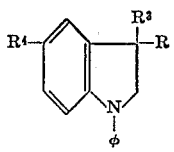

TABLE II

| | R | R³ | R⁴ |
|---|---|---|---|
| (a) | —CH₂—CH₂—NMe₂ | CH₃ | H |
| (b) | —CH₂—CH₂—N(CH₂—C₆H₅)(Me) | CH₃ | H |
| (c) | —CH₂—CH₂—CH₂—NHMe | CH₃ | H |
| (d) | —CH₂—CH₂—CH₂—NMe₂ | CH₃ | H |
| (e) | —CH₂—CH₂—CH₂—N(CH₂—C₆H₅)(Me) | CH₃ | H |
| (f) | —(CH₂)₂—NHMe | n—C₄H₉ | H |
| (g) | —(CH₂)₂—NMe₂ | n—C₄H₉ | H |
| (h) | —(CH₂)₃—NHMe | n—C₄H₉ | H |
| (i) | —(CH₂)₃—NMe₂ | n—C₄H₉ | H |

| | (1) | (2) | (3) | (4) | (5) | (6) |
|---|---|---|---|---|---|---|
| | Potentiation of amphetamine excitation | Antagonism of tetrabenazine sedation | Antagonism of reserpine hypothermia | Antagonism of norepinephrine hypothermia | Potentiation of nictitating membrane | Potentiation of norepinephrine on blood pressure |
| (a) | +++ | 0/+ | +/++ | + | 0 | ++ |
| (b) | ++ | 0 | 0 | 0 | 0 | ++ |
| (c) | +++ | ++ | + | ++ | +/++ | +++ |
| (d) | ++ | + | 0 | + | 0 | + |
| (e) | +/+++ | 0 | ++ | + | − | − |
| (f) | ++ | 0 | + | 0 | 0 | + |
| (g) | +++ | 0 | + | + | 0 | 0 |
| (h) | +++ | 0 | + | + | 0 | ++ |
| (i) | +++ | 0 | ++ | + | + | +/++ |

The rating of activity for the above tests is as follows:
o = inactive
+ = slightly active
++ = moderately active
+++ = very active The mode of administration and host for each test is as follows:

(1) orally, 25 mg./kg. (rats)
(2) orally, 50+20 mg./kg. (rats)
(3) intraperitoneally 10 mg./kg. (mice)
(4) orally, 10+10 mg./kg. (mice)
(5) intravenously, 0.05 to 5 mg./kg. (cats)
(6) intravenously, 0.5 to 5 mg./kg. (cats)

Comments:

(1) see Quinton et al. Nature, 200, 178 (1963)
(2) see Sulser et al., J. Pharm. Exp. Therap., 144, 321 (1964)
(3) see Askew, Life Science, 2 725 (1963). The reserpine is injected subcutaneously 18 hours before an intraperitoneal, injection of test compound.
(4) see Brittain, J. Pharm. Pharmac., 18, 621 (1966).

The norepinephrine is injected intraventricularly after two successive/oral doses of the test compound.

(5) see Thoenen et al., Helv. physiol. pharmacol. Acta, 22, 15 (1964). The nictitating membrane is subjected to low frequency electrical stimulation after various intravenous doses of test compound.

(6) see Halliwell et al., British J. Pharmacol, 23, 330 (1964). Blood pressure is assessed after intravenous injection of test compound.

A positive result in any of the tests (1) to (6) indicates that the compound has some action on the adrenergic nervous system.

What is claimed is:

1. A method of alleviating mental depression in a mentally depressed host which comprises administering to the host an effective amount of a compound selected from the group consisting of those of he formula

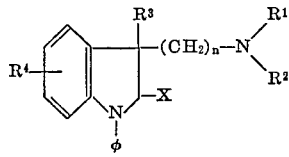

wherein $R^1$ and $R^2$ are each seleced from the group consisting of hydrogen, alkyl of from 1 to 4 carbon atoms, and benzyl and $R^1$ and $R^2$ when taken together, complete a ring selected from the group consisting of piperidino, pyrrolidino, morpholino, piperazino, N'-benzylpiperazino, N'-alkylpiperazino and N'-hydroxyalkylpiperazino, said alkyl containing from 1 to 4 carbon atoms;

$R^3$ is selected from the group consisting of alkyl of from 1 to 4 carbon atoms, phenyl and benzyl;

$R^4$ is selected from the group consisting of hydrogen, nitro and halogen (F, Cl, Br, I);

$n$ is an integer of from 2 to 4;

X is selected from the group consisting of 2 hydrogen atoms and an oxygen atom;

and the pharmaceutically-acceptable acid addition salts thereof.

2. The method as in claim 1 wherein said compound is 3-(2-dimethylaminoethyl)-3-methyl-1-phenyl-indoline.

3. The method as in claim 1 wherein said compound is 3-methyl-3-(3-methylaminopropyl)-1-phenyl-indoline.

4. The method as in claim 1 wherein said compound is 3-[3 - (N-benzyl-N-methylamino)propyl] - 3 - methyl-1-phenyl-indoline.

5. The method of claim 1 wherein $R^3$ is methyl, $R^4$ is hydrogen, $n$ is 2 and X is oxygen.

6. The method of claim 1 wherein $R^1$ is hydrogen and $R^2$ is methyl.

7. The method of claim 1 wherein $R^1$ and $R^2$ are each methyl.

8. The method of claim 1 wherein $R^3$ is methyl, $R^4$ is hydrogen, $n$ is 3 and X is oxygen.

9. The method of claim 8 wherein $R^1$ is hydrogen and $R^2$ is methyl.

10. The method of claim 8 wherein $R^1$ and $R^2$ are each methyl.

11. The method of claim 8 wherein $R^1$ is methyl and $R^2$ is benzyl.

12. A composition is dosage unit form useful for alleviating mental depression in a host comprising a pharmaceutical carrier and from about 5 mg. to about 150 mg. of a compound selected from the group consisting of those of the formula:

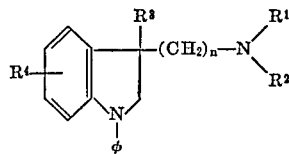

wherein $R^1$ and $R^2$ are each selected from the group consisting of hydrogen, alkyl of from 1 to 4 carbon atoms and benzyl and $R^1$ and $R^2$ when taken together, complete a ring selected from the group consisting of piperidino, pyrrolidino, morpholino, piperazino, N'-benzyljiperazino, N'-alkylpiperazino and N'-hydroxyalkylpiperazino, said alkyl containing from 1 to 4 carbon atoms;

$R^3$ is selected from the group consisting of alkyl of from 1 to 4 carbon atoms, phenyl and benzyl;

$R^4$ is selected from the group consisting of hydrogen, nitro and halogen (F, Cl, Br, I);

$n$ is an integer of from 2 to 4;

and the pharmaceutically-acceptable acid addition salts thereof.

13. A composition as claimed in claim 12 wherein said compound is 3 - methyl-3-(3-methylaminopropyl)-1-phenyl-indoline.

References Cited

Walker et al., J. Med. Chem., vol. 8, pp. 626–37 (1965).

STANLEY J. FRIEDMAN, Primary Examiner